(12) United States Patent
Deore et al.

(10) Patent No.: US 9,866,493 B2
(45) Date of Patent: Jan. 9, 2018

(54) DYNAMIC ACTIVATION OF PRE-DEPLOYED NETWORK RESOURCES

(71) Applicants: Abhijeet D. Deore, Sunnyvale, CA (US); Manish Chandra, Plano, TX (US); Dharmendra Naik, San Jose, CA (US); Kiran Kumar Dintakurthi, Fremont, CA (US); Konstantin Saunichev, San Jose, CA (US); Biao Lu, Saratoga, CA (US); Steven Joseph Hand, Los Gatos, CA (US); Sudhanshu Verma, Sunnyvale, CA (US)

(72) Inventors: Abhijeet D. Deore, Sunnyvale, CA (US); Manish Chandra, Plano, TX (US); Dharmendra Naik, San Jose, CA (US); Kiran Kumar Dintakurthi, Fremont, CA (US); Konstantin Saunichev, San Jose, CA (US); Biao Lu, Saratoga, CA (US); Steven Joseph Hand, Los Gatos, CA (US); Sudhanshu Verma, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 662 days.

(21) Appl. No.: 13/853,758

(22) Filed: Mar. 29, 2013

(65) Prior Publication Data

US 2014/0297865 A1    Oct. 2, 2014

(51) Int. Cl.
*G06F 15/173* (2006.01)
*H04L 12/823* (2013.01)
(Continued)

(52) U.S. Cl.
CPC ............ *H04L 47/32* (2013.01); *H04L 47/788* (2013.01); *H04L 47/805* (2013.01); *H04L 47/829* (2013.01)

(58) Field of Classification Search
CPC ..... H04L 47/32; H04L 47/788; H04L 47/805; H04L 47/829
See application file for complete search history.

(56) References Cited

U.S. PATENT DOCUMENTS 6,681,232 B1 * 1/2004 Sistanizadeh ....... H04L 12/2602
7,065,580 B1 * 6/2006 Eberle ..................... H04L 49/55
                                                                 370/447

(Continued)

*Primary Examiner* — Ryan Jakovac
(74) *Attorney, Agent, or Firm* — David L. Soltz (57) ABSTRACT

A network device may receive an activation instruction. The network device may provide network resources. The activation instruction may request the network device to activate a particular network resource that is deactivated. The activation instruction may be associated with a license that identifies the particular network resource and identifies a resource request of a user. The network device may configure, based on the activation instruction, a component of the network device to activate the particular network resource. The component, after being configured to activate the particular network resource, may allow data flows, received by the network device, to be provided towards a destination device using the particular network resource. The network device may receive a data flow and provide, by the component of the network device, the data flow towards the destination device using the particular network resource.

10 Claims, 7 Drawing Sheets

(51) Int. Cl.
*H04L 12/911* (2013.01)
*H04L 12/927* (2013.01)

(56) References Cited

U.S. PATENT DOCUMENTS

| | | | |
|---|---|---|---|
| 7,116,682 B1 * | 10/2006 | Waclawsky | H04J 3/1682 370/468 |
| 2008/0069206 A1 * | 3/2008 | Yang | H04N 7/17318 375/240.01 |
| 2012/0301134 A1 * | 11/2012 | Davari | H04L 41/5038 398/9 |
| 2014/0161447 A1 * | 6/2014 | Graves | H04Q 11/0005 398/48 |

* cited by examiner

| Customer Information 410 | | | Bandwidth Information 420 | | QoS 430 |
|---|---|---|---|---|---|
| Account # | License # | Device ID | Allocated | Total | |
| Account #1 | License #1 | Device ID #1 | 300 gbps | 500 gbps | QoS #1 |
| Account #2 | License #2 | Device ID #2 | 400 gbps | 1000 gbps | QoS #2 |
| Account #3 | License #3 | Device ID #3 | 1000 gbps | 1000 gbps | QoS #3 |
| Account #4 | License #4 | Device ID #4 | 1100 gbps | 1500 gbps | QoS #4 |

DYNAMIC ACTIVATION OF PRE-DEPLOYED NETWORK RESOURCES

BACKGROUND

Network devices, such as routers, switches, gateways, etc., are sometimes deployed by a network service provider to provide network services to a user (e.g., to allow the user to transmit/receive data flows via a client device). Network devices provide a fixed amount of bandwidth available to the user, thereby making it difficult for the network service provider to modify a user's resource allocation. For example, to modify the user's resource allocation (e.g., to reduce a resource allocation to allow a user to reduce subscription costs or to increase the resource allocation to satisfy an increase in resource demand), the network service provider may need to physically add or remove a network device and/or physically reconfigure a network device (e.g., add or remove components from the network device, reconfigure connections of the network device, etc.). The activities required to modify resource allocations to users often result in costly modifications by the network service provider.

SUMMARY

According to some possible implementations, a method may include receiving, by a network device, an activation instruction. The network device may provide network resources. The activation instruction may request the network device to activate a particular network resource that is deactivated. The activation instruction may be associated with a license that identifies the particular network resource and identifies a resource request of a user. The method may include configuring, by the network device and based on the activation instruction, a component of the network device to activate the particular network resource. The component, after being configured to activate the particular network resource, may allow data flows, received by the network device, to be provided towards a destination device using the particular network resource. The method may include receiving, by the network device, a data flow; and providing, by the component of the network device, the data flow towards the destination device using the particular network resource.

According to some possible implementations, a network device may receive an activation instruction. The network device may provide network resources. The activation instruction may request the network device to activate a particular network resource that is deactivated. The activation instruction may be associated with a license that identifies the particular network resource and identifies a resource request of a user. The network device may configure, based on the activation instruction, a component of the network device to activate the particular network resource. The component, after being configured to activate the particular network resource, may allow data flows, received by the network device, to be provided towards a destination device using the particular network resource. The network device may receive a data flow and provide, by the component of the network device, the data flow towards the destination device using the particular network resource.

According to some possible implementations, a computer-readable medium for storing instructions may include multiple instructions which, when executed by one or more processors associated with a network device, cause the one or more processors to receive an activation instruction. The network device may provide network resources. The activation instruction may request the network device to activate a particular network resource that is deactivated. The activation instruction may be associated with a license that identifies the particular network resource and identifies a resource request of a user. The multiple instructions may cause the one or more processors to configure, based on the activation instruction, a component of the network device to activate the particular network resource. The component, after being configured to activate the particular network resource, may allow data flows, received by the network device, to be provided towards a destination device using the particular network resource. The multiple instructions may cause the one or more processors to receive a data flow and provide, by the component of the network device, the data flow towards the destination device using the particular network resource.

DETAILED DESCRIPTION

The following detailed description refers to the accompanying drawings. The same reference numbers in different drawings may identify the same or similar elements.

Systems and/or methods, as described herein, may provide a technique to remotely activate and/or deactivate network resources pre-deployed by a network service provider. For example, the systems and/or methods may activate and/or deactivate network channels (or portions of the network channels) that may provide the network resources. Additionally, or alternatively, the systems and/or methods may activate and/or deactivate access to network ports on a network device that provides the network resources, In some implementations, the network resources may be activated and/or deactivated based on resource demand of a customer of the network service provider (e.g., a user, a company, and/or some other party that utilizes the network resources). For example, the quantity of active network channels may be proportional to the amount of bandwidth allocated to the customer. In some implementations, the network ports may provide network resources, such as bandwidth resources, switching resources, data flow transmission services via a particular interface (e.g., a fiber channel interface, gigabit Ethernet interface, or the like), or some other type of network resource. As such, the network ports may be activated and/or deactivated based on resource demands of the customer. For example, a particular network port may be activated when the user requests access to a network service associated with the particular network port.

As used herein, the term "user" may be used interchangeably with the term "customer." Also, the term "activate" may also be used interchangeably with the term "deactivate." That is, when describing examples for activation of network resources, the same examples may also apply to the deactivation of the network resources.

Figure 1:
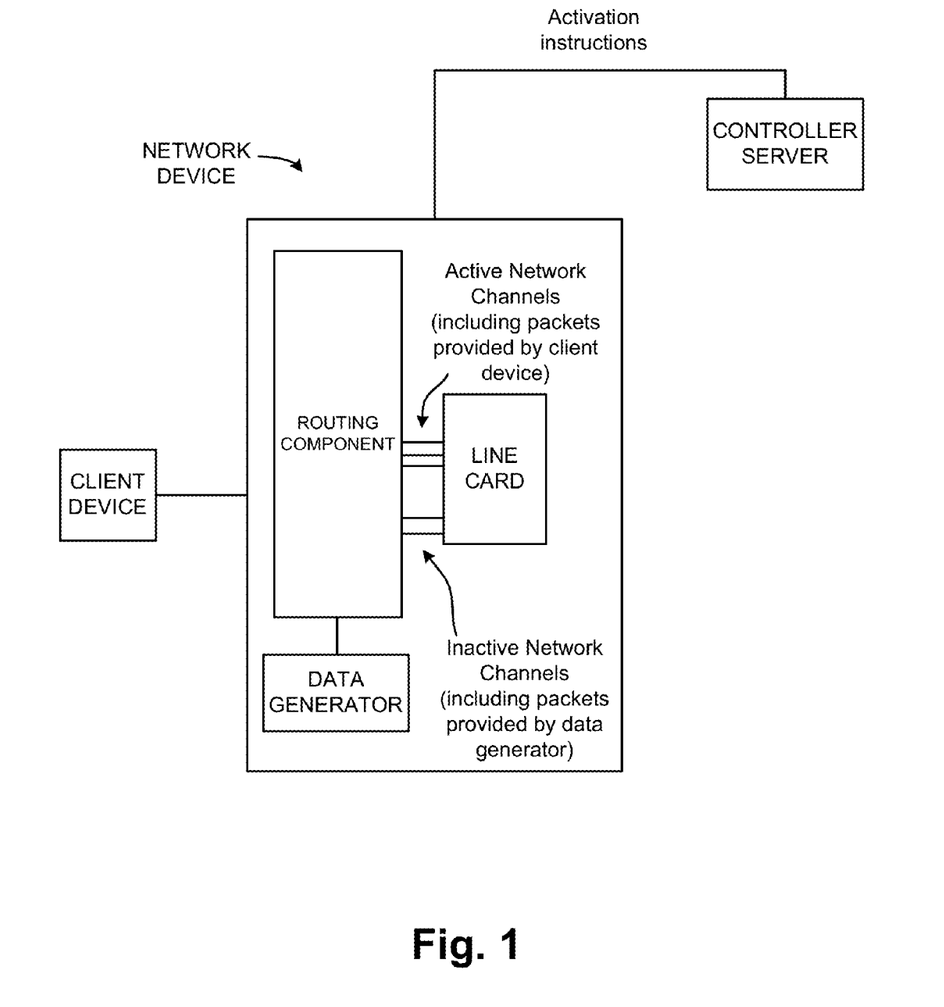
FIG. 1 illustrates an example overview of an implementation described herein.

FIG. 1 illustrates an example overview of an implementation described herein. In FIG. 1, assume that a user subscribes to a network service provider to transmit data flows using a client device (e.g., using network resources, provided by the network device, via network channels and/or via network ports). Further, assume that a controller server receives information that identifies a quantity of network channels that are to be activated for the user and/or particular network ports that the user may access (e.g., based on a resource demand of the user, based on the user's agreement with the network service provider, etc.). Given this assumption, the controller server may provide activation instructions to the network device (or to multiple network devices) which transmit the data flows between the client devices (e.g., to activate and/or deactivate network resources provided by the network device). As used herein, the term "activation instructions" may be used interchangeably with the term "deactivation instructions." In some implementations, a network device may be pre-deployed with a particular amount of active network resources such that additional network resources may be activated based on the resource demand of the user (e.g., at a later time after the network device has been pre-deployed.

In some implementations, the activation instructions may invoke software implemented on the network device to activate and/or deactivate network resources. For example, the activation instructions may cause particular network channels, associated with a line card device (e.g., a photonic integrated circuit (PIC) or some other type of line card device) in the network device, to become active or inactive. For example, the network device may include a routing component that activates a network channel by providing a data flow, provided by a client device, to the network channel associated with the line card that, in turn, transmits the data flow. The resources (e.g., bandwidth) provided by the network device (e.g., the amount of data transmitted via the line card) may be proportional to the quantity of active network channels (e.g., the network channels that receive packets of a data flow provided by the client device). In some implementations, the line card may combine multiple network channels to form a super-channel having bandwidth that includes the sum of the multiple network channels.

In some implementations, the activation instructions may cause the network device to block packets from reaching the inactive network channels (e.g., by blocking services provided by routing and/or switching components of the network device). In some implementations, the activation instructions may cause the network device to deactivate a network channel by causing a data generator component (e.g., a pseudo-random binary sequence (PRBS) component, a bit generator, or the like) to provide data packets to the PIC (e.g., via the inactive network channel) such that the inactive network channel does not receive data packets of a data flow provided by the client device.

In some implementations, the activation instructions may cause the network device to activate a particular network port to grant access to the particular network port that receives a data flow. Also, the activation instruction may cause the network device to deactivate the particular network port to block access to the particular network port.

As described above, the network channels and/or the network ports may be activated and/or deactivated based on resource demand of a user of the network channels and/or based on an amount of resources paid for or requested by the user. For example, additional network channels and/or the network ports may be activated to satisfy an increase in the user's resource demand. Additionally, or alternatively, network channels and/or the network ports may be deactivated (e.g., when the user's resource demand is reduced) to reduce the user's costs associated with using network channels and/or the network ports that the user may not need. For example, as shown in FIG. 1, the controller server may cause three network channels to be activated such that packets, associated with a data flow provided by a client device, may be transmitted via the three network channels. At a later point in time, the controller server may generate an activation instruction to cause the network device to increase the quantity of active network channels from three network channels to five network channels (or some other quantity of active network channels). Alternatively, the controller server may generate an activation instruction to cause the network device to reduce the quantity of active network channels.

As described herein, network channels may refer to an entire network channel or a portion of a network channel. That is, an activation instruction may cause the network device to activate or deactivate an entire network channel or a portion of the network channel (e.g., to provide a portion of resources provided by the network channel).

In some implementations, the systems and/or methods may offer the user of network resources a level of flexibility by allowing particular network resources (e.g., network channels and/or network ports) to be activated and/or deactivated (e.g., based on receiving an instruction from the user to activate and/or deactivate the network resources and/or based on an automated technique that activates and/or deactivates network resources, without user interaction). In some implementations, network resources may be activated and/or deactivated without a modification in a hardware configuration of the network device. That is, network resources may be activated and/or deactivated without the need to install new hardware, remove existing hardware, or reconfigure existing hardware, thereby reducing time and cost associated with increasing or decreasing a user's network resource allocation.

Figure 2:
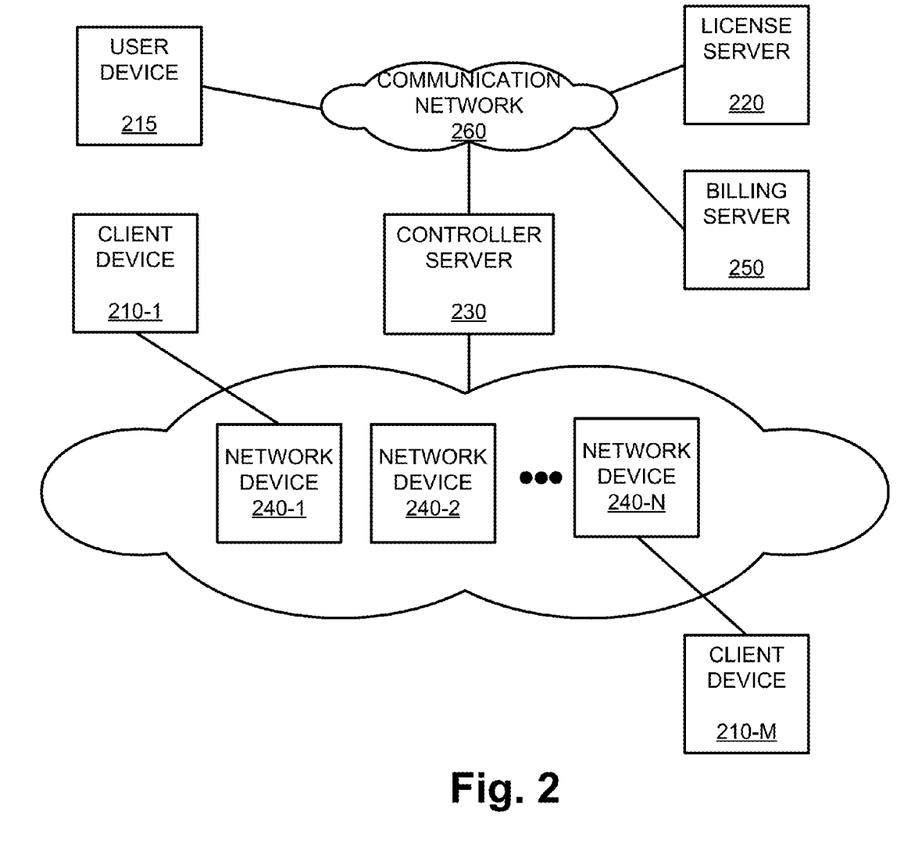
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1) (referred to collectively as "client devices 210" and individually as "client device 210"), user device 215, license server 220, controller server 230, network devices 240-1, . . . , 240-N (where N>1) (referred to collectively as "network devices 240" and individually as "network device 240"), billing server 250, and communication network 260.

Client device 210 may include any type of network device, such as a router, a switch, or a central office, that may transmit and/or receive data traffic. In some implementations, client device 210 may transmit a client signal (e.g., an optical transport network (OTN) signal, a synchronous optical network (SONET) signal, a synchronous digital hierarchy (SDH) signal, an Ethernet signal, or another type of signal) to network devices 240. The client signal may conform to any payload type, such as the payload types identified above.

User device 215 may include a device capable of communicating via a network, such as communication network 260. For example, user device 215 may correspond to a mobile communication device (e.g., a smart phone or a personal digital assistant (PDA)), a portable computer device (e.g., a laptop or a tablet computer), or another type of device, such as a desktop computing device, a server, or the like. In some implementations, user device 215 may communicate with license server 220 to provide license server 220 with licensing information that identifies a resource demand for a particular user of network services.

License server 220 may include one or more computing devices, such as a server device or a collection of server devices. In some implementations, license server 220 may store licensing information that identifies a resource demand for a particular user of network services. For example, license server 220 may provide a user interface to receive the licensing information. Additionally, or alternatively, license server 220 may receive the licensing information via a web portal and/or via some other technique. In some implementations, license server 220 may be remotely accessible via user device 215.

Controller server 230 may include one or more computing devices, such as a server device or a collection of server devices. In some implementations, controller server 230 may receive licensing information from license server 220 to determine instructions that network device 240 may execute to activate and/or deactivate network resources. For example, controller server 230 may determine instructions that cause network device 240 to modify routing/switching services in order to activate and/or deactivate network resources and/or to prevent packets, provided by client device 210, from being provided to inactive network channels or processed/utilized by inactive network ports. In some implementations, controller server 230 may receive licensing information from user device 215 without involving license server 220.

Network device 240 may include a digital switching device (e.g., an OTN device), a dense wavelength division multiplexing (DWDM) device, or a device that is a combination of a digital switching device and a DWDM device. For example, network device 240 may perform digital or optical multiplexing operations (e.g., receive individual client signals on individual channels and generate multiplexed signal, such as multiplexed digital signal or a multi-wavelength optical signal, that may be transmitted on a single channel), amplification operations (e.g., amplify the multiplexed signal), add-drop multiplexing operations (e.g., remove one or more client signals from the multiplexed signal), and/or demultiplexing operations (e.g., receive the multiplexed signal and separate the multiplexed signal back into individual client signals that may be transmitted on individual channels). To perform these operations, network device 240 may contain various components, such as multiplexer (to perform the multiplexing operations), an amplifier (to perform the amplification operations), an add-drop multiplexer (e.g., a remotely configurable add/drop multiplexer (ROADM)) (to perform the add-drop multiplexing operations), and/or a demultiplexer (to perform the demultiplexing operations).

In some implementations, network device 240 may receive a data flow from client device 210 and transmit the data flow via one or more network channels and/or network ports). As described above, network device 240 may receive activation instructions and may invoke software, implemented by network device 240, to execute the activation instructions to activate and/or deactivate network resources provided by network device 240. In some implementations, network devices 240 may be connected via an optical network, such as an optical transport network (OTN), a DWDM optical layer, and/or a combination of these or other types of networks.

Billing server 250 may include one or more computing devices, such as a server device or a collection of server devices. In some implementations, billing server 250 may receive license information (e.g., license information for a new customer of network services and/or updated license information for an existing customer of network services) and may assess a debit transaction and/or a credit transaction to an account of a network service provider, which provides network resources, and/or to an account of the customer. In some implementations, billing server 250 may identify a debit/credit amount based on information associated with the license that identifies a quantity of network channels/network ports activated and/or a fee to charge per network channel/network port.

Communication network 260 may include one or more wired and/or wireless networks. For example, network 250 may include a cellular network, a public land mobile network (PLMN), a second generation (2G) network, a third generation (3G) network, a fourth generation (4G) network, a fifth generation (5G) network, and/or another network. Additionally, or alternatively, communication network 260 may include a local area network (LAN), a wide area network (WAN), a metropolitan network (MAN), a telephone network (e.g., the Public Switched Telephone Network (PSTN)), an ad hoc network, a managed IP network, a multiprotocol layer switching (MPLS) network, an IP/MPLS network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
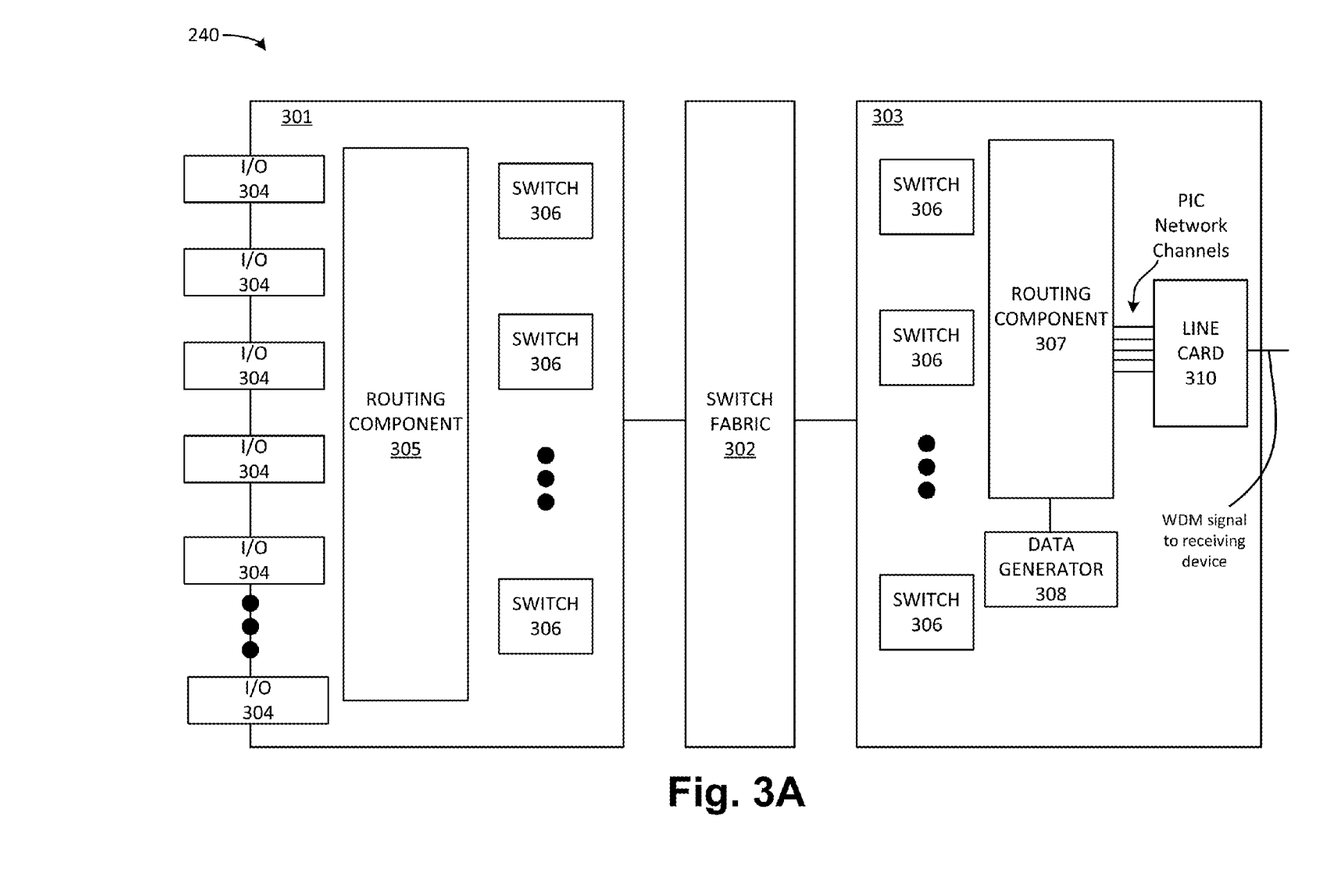
FIG. 3A illustrates example components of a network device that may be used within the environment of FIG. 2.

FIG. 3A illustrates example components of network device 240 that may be used within the environment of FIG. 2. As shown in FIG. 3A, network device 240 may include OTN module (OM) 301, switch fabric 302, and line module 303. OM 301 may include input/output (I/O) components 304, routing component 305 and switches 306.

I/O component 304 may include hardware components, or a combination of hardware and software components, that may support flexible adding-dropping of multiple services, such as SONET/SDH services, gigabit Ethernet (GbE) services, OTN services, and/or fiber channel (FC) services. I/O component 304 may perform functions, such as client data encapsulation and decapsulation. I/O component 304 may connect to a physical link that could be one of many types of transport media, such as optical fiber or Ethernet cable, a tributary interface module (TIM), a small-form pluggable (SFP) module, or the like. In some implementations, I/O component 304 may correspond to a network port that may be activated and/or deactivated.

Routing component 305 may include a routing processor, a collection of routing processors, and/or one or more switching planes, such as a single or multi-stage switch fabric. In some implementations, routing component 305 may perform a high level management function for OM 301 and may include a fabric manager to process digital signals for transmission to switches 306 and/or switch fabric 302. For example, routing component 305 may receive activation instructions, from controller server 230, to modify routing/switching services in order to activate and/or deactivate network resources and/or to prevent packets, provided by client device 210, from being provided to inactive network channels and/or processed/utilized by inactive network ports. In some implementations, routing component 305 may convert a data flow for transmission across a particular network layer (e.g., a packet-based layer, a digital layer, or an optical layer). In some implementations, routing component 305 may activate a network channel by causing switches 306 to provide packets, associated with a data flow provided by client device 210 (e.g., via I/O component 304), to line card 310 via the network channel.

In some implementations, routing component 305 may deactivate a network port by powering off the network port. Additionally, or alternatively, routing component 305 may deactivate a network port by routing a data flow, received by inactive network port (e.g., a network port that is to be deactivated), to a packet dropper. Additionally, or alternatively, routing component 305 may discard packets received via an inactive network port. Additionally, or alternatively, routing component 305 may not process data flows received via an inactive network port.

In some implementations, routing component 305 may communicate with networks and/or systems connected to network device 240 to exchange information regarding network topology. In some implementations, routing component 305 may generate routing tables based on network topology information, may generate forwarding tables based on the routing tables, and may send the forwarding tables to I/O components 304. In some implementations, routing component 305 may perform other general control and monitoring functions for OM 301.

Switch 306 may include one or more switching planes to facilitate communication between two or more of I/O components 304, routing component 305, line card component 303, and/or some other component in network device 240. In some implementations, switch 306 may include a single or multi-stage switch fabric.

In some implementations, switch fabric 302 may include one or more switching planes, hardware components, or a combination of hardware and software components to facilitate communication between OM 301 and line module 303. In some implementations, switch fabric 302 may include a single or multi-stage switch fabric.

Line module 303 may include hardware components, or a combination of hardware and software components, that may provide network interface operations. For example, line module 303 may include switches 306, routing component 307, data generator component 308, and line card 310. In some implementations, line module 303 may receive a multi-wavelength optical signal and/or transmit a multi-wavelength optical signal. A multi-wavelength optical signal may include a number of optical signals of different optical wavelengths. In one implementation, line module 303 may perform retiming, reshaping, regeneration, time division multiplexing, and/or recoding services for each optical wavelength.

Routing component 307 may include a routing processor, a collection of routing processors, one or more switching planes, such as a single or multi-stage switch fabric. In some implementations, routing component 307 may perform a high level management function for line module 303 and may include a fabric manager to process digital signals for transmission to network channels associated with PIC 310. For example, routing component 307 may receive activation instructions from controller server 230 to modify routing/switching services in order to activate and/or deactivate network resources and/or to prevent packets, provided by client device 210, from being provided to inactive network channels and/or processed/utilized by inactive network ports.

In some implementations, routing component 307 may activate a network channel by providing packets, associated with a data flow provided by client device 210 (e.g., via I/O component 304), to line card 310 via the network channel. In some implementations, routing component 307 may deactivate a network channel by providing packets, associated with a data flow provided by data generator component 308, to line card 310 (e.g., such that line card 310 receives a data flow having a bit sequence via the network channel in lieu of receiving packets of a data flow provided by client device 210). In some implementations, routing component 307 may include an adaptation component having an optical-electrical-optical (OEO) device to convert an optical signal to an electrical signal, and/or to convert an electrical signal to an optical signal (e.g., to transport a data flow via an optical network layer and/or via a packet-based network layer).

Data generator component 308 may include an optical device, or a collection of optical devices, such as a PRBS component or some other type of data generation component. In some implementations, data generator component 308 may provide an optical signal having data corresponding to a random or a predetermined series of bits. In some implementations, data generator component 308 may provide the optical signal to line card 310 (e.g., via routing component 307 and/or via a network channel of line card 310) and may receive a response from line card 310 based on providing the optical signal to line card 310. In some implementations, routing component 307 may receive the response and may determine that the network channel of line card 310 is able to send and receive data properly (e.g., when the response includes data corresponding to data sent by data generator component 308).

Line card 310 may include an optical device, or a collection of optical devices. In some implementations, line card 310 may include a PIC having one or more optical components, such as an OEO device, an optical transmitter, an optical receiver, a combined optical transceiver, a laser, a modulator, an amplifier (e.g., a transimpedence amplifier (TIA) and/or some other type of amplifier), a photodiode, an arrayed waveguide grating (AWG), a rotator, a polarizer, a mirror, a heater, a splitter, a coupler, and/or some other optical component. In some implementations, line card 310 may receive a data flow from I/O component 304 and/or data generator component 308 (e.g., via switch 306) via a network channel of line card 310. In some implementations, line card 310 may be tuned to use an optical carrier (e.g., a network channel) of a designated wavelength. It may be desirable that the grid of wavelengths emitted by line card 310 conform to a known standard, such as a standard published by the Telecommunication Standardization Sector (ITU-T). It may also be desirable that the grid of wavelengths be flexible and tightly packed to create a super-channel. In some implementations, line card 310 may combine multiple network channels to form a super-channel having bandwidth that includes the sum of the multiple network channels.

In some implementations, line card 310 may convert the data flow from an electrical signal to an optical signal and may transmit the data flow in the form of a wavedivision multiplexed (WDM) signal to a receiving device (e.g., another network device 240) such that the WDM signal may be converted from an optical signal into an electrical signal and/or a packet-based message (or some other type of signal or message) for transmission to client device 210. In some implementations, the receiving device may interpret the WDM signal and may filter out data flows/packets provided by data generator component 308. In some implementations, the WDM signal may be transmitted by a fiber optic network.

In some implementations, line card 310 may receive packets, associated with a data flow, via multiple network channels. In some implementations, the multiple network channels may be activated and/or deactivated by controller server 230. For example, an active network channel may receive packets associated with a data flow provided by client device 210, whereas an inactive network channel may receive packets associated with a data flow provided by data generator component 308. Because active network channels may transmit packets associated with a data flow provided by client device 210, the quantity of active network channels may be proportional to bandwidth provided by network device 240.

The quantity of components of network device 240, illustrated in FIG. 3A, is not limited to what is shown. In practice, there may be additional components, fewer components, different components, or differently arranged components than illustrated in FIG. 3A. Also, in some implementations, one or more of the components of network device 240 may perform one or more functions described as being performed by another one or more of the components in network device 240. Components of network device 240 may interconnect via wired connections, wireless connections, or a combination of wired and wireless connections. Also, in some implementations, the components may be implemented in a single physical device, or may be implemented in multiple physical devices in multiple locations.

Figure 3B:
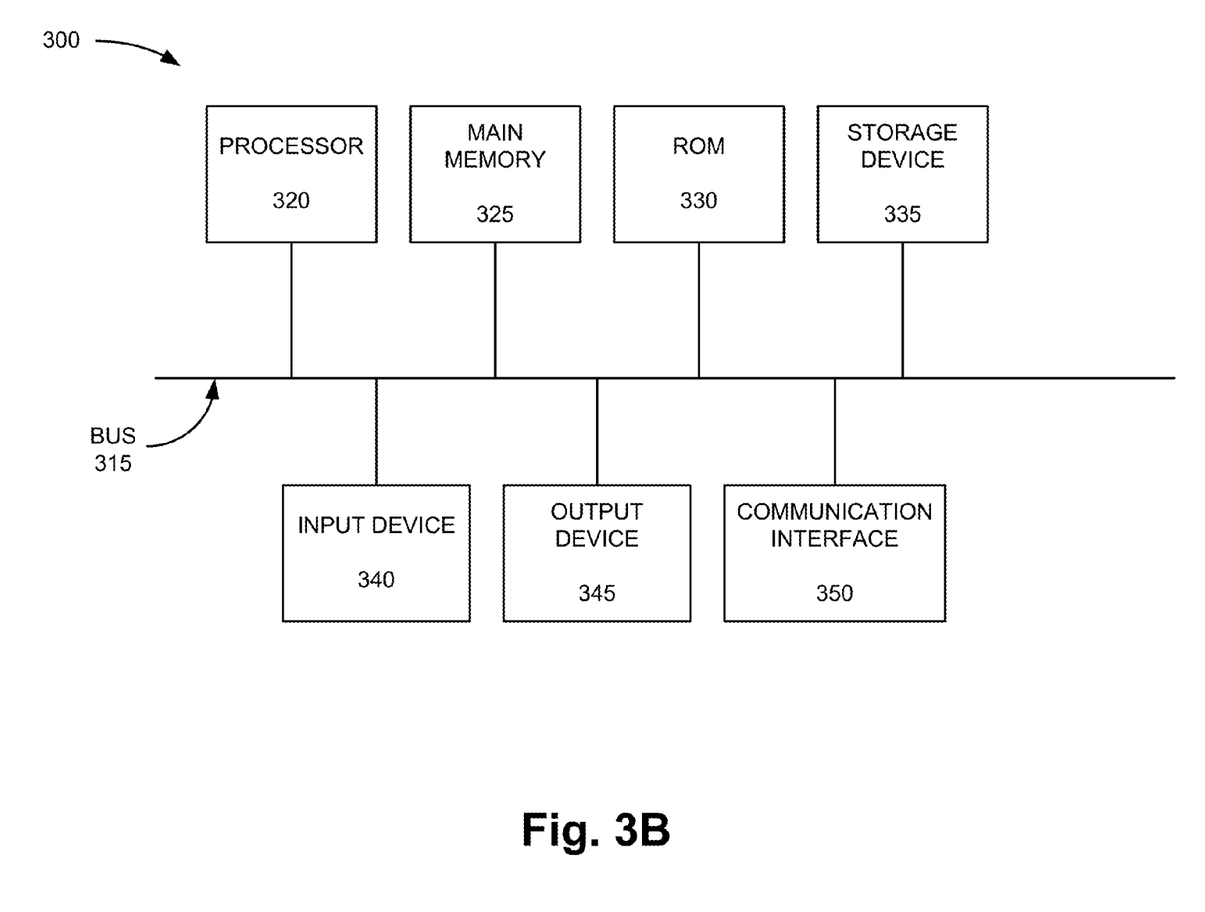
FIG. 3B illustrates example components of a device that may be used within the environment of FIG. 2.

FIG. 3B illustrates example components of a device 300 that may be used within environment 200 of FIG. 2. Device 300 may correspond to client device 210, license server 220, controller server 230, and/or billing server 250. Each of client device 210, license server 220, controller server 230, and/or billing server 250 may include one or more devices 300 and/or one or more components of device 300.

As shown in FIG. 3B, device 300 may include a bus 315, a processor 320, a main memory 325, a read only memory (ROM) 330, a storage device 335, an input device 340, an output device 345, and a communication interface 350.

Bus 315 may include a path that permits communication among the components of device 300. Processor 320 may include a processor, a microprocessor, an application specific integrated circuit (ASIC), a field programmable gate array (FPGA), or another type of processor that interprets and executes instructions. Main memory 325 may include a random access memory (RAM) or another type of dynamic storage device that stores information or instructions for execution by processor 320. ROM 330 may include a ROM device or another type of static storage device that stores static information or instructions for use by processor 320. Storage device 335 may include a magnetic storage medium, such as a hard disk drive, or a removable memory, such as a flash memory.

Input device 340 may include a component that permits an operator to input information to device 300, such as a control button, a keyboard, a keypad, or another type of input device. Output device 345 may include a component that outputs information to the operator, such as a light emitting diode (LED), a display, or another type of output device. Communication interface 350 may include any transceiver-like mechanism that enables device 300 to communicate with other devices or networks. In some implementations, communication interface 350 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as main memory 325. A computer-readable medium may be defined as a non-transitory memory device. A memory device may include memory space within a single physical storage device or memory space spread across multiple physical storage devices.

The software instructions may be read into main memory 325 from another computer-readable medium, such as storage device 335, or from another device via communication interface 350. The software instructions contained in main memory 325 may direct processor 320 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3B.

Figure 4:
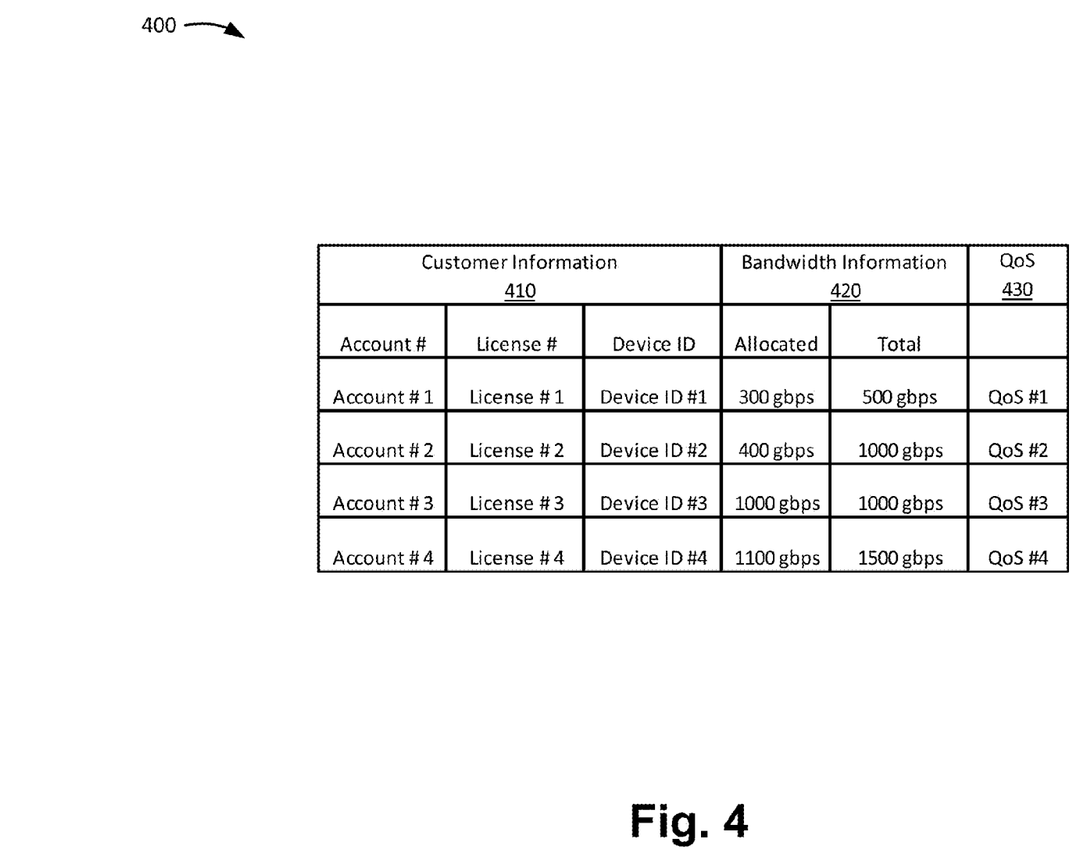
FIG. 4 illustrates an example data structure that may be stored by one or more devices in the environment of FIG. 2.

FIG. 4 illustrates an example data structure 400 that may be stored by one or more devices in environment 200. In some implementations, data structure 400 may be stored in a memory of license server 220. In some implementations, data structure 400 may be stored in a memory separate from, but accessible by, license server 220. In some implementations, data structure 400 may be stored by some other device in environment 200, such as client device 210, controller server 230, and/or network device 240. In some implementations, data structure 400 may store information identifying licensing information for a user of network device 240.

As shown in FIG. 4, data structure 400 may include customer information field 410, bandwidth information field 420, and Quality of Service (QoS) field 430.

Customer information field 410 may store information identifying a particular license associated with a user of network device 240. For example, customer information field 410 may store an account number, a license number, and/or some other license related information (e.g., information regarding a user of the license). In some implementations, the account number may be used to identify billing information such that an account may be charged for network services provided by network device 240. In some implementations, the amount charged may be based on the amount of bandwidth provided by network device 240 (e.g., based on the quantity of active network channels provided by network device 240). In some implementations, the license number may be used to cross-check the account number and/or to identify a quantity of network channels/network ports that the user has selected to have active (e.g., based on resource demands of the user and/or based on what the user has paid for or requested). In some implementations, customer information field 410 may also include a device identifier (e.g., a serial number or some other type of identifier) of a network card or network equipment associated with the license (e.g., network equipment used to provide network resources).

Bandwidth information field 420 may store information identifying bandwidth allocated to a particular license and total bandwidth capacity associated with a particular license (e.g., a total bandwidth capacity provided by a particular network device 240 associated with the particular license). For example, the total bandwidth capacity may be based on a quantity of total network channels provided by network device 240 multiplied by the total bandwidth provided by each of the network channels. In some implementations, bandwidth information field 420 may store an allocated bandwidth value corresponding to the quantity of network channels activated. As an example, assume that network device 240 provides a total quantity of five network channels and that each network channel provides 100 gigabits per second (gbps) of bandwidth. Further, assume that three channels are active. Given these assumptions, bandwidth information field 420 may store a total bandwidth capacity value of 500 gbps and an allocated bandwidth capacity value of 300 gbps.

In some implementations, bandwidth information field 420 may store information identifying network resources (e.g., in addition to or instead of bandwidth) allocated to a particular license. For example, bandwidth information field 420 may store information identifying services that a user may wish to receive via network ports of network device 240 (e.g., SONET/SDH services, gigabit Ethernet (GbE) services, OTN services, and/or FC services). Additionally, or alternatively, bandwidth information field 420 may store information identifying an amount of resources that the user may wish to receive (e.g., a particular unit of measure of GbE services, a particular unit of measure of SONET/SDH services, etc.).

QoS field 430 may include information identifying QoS treatments that a particular network device 240, associated with a particular license/user, may apply to data flow. For example, QoS field 430 may include information that directs network device 240 to provide a guaranteed bit rate (GBR) to the data flow, a maximum latency value to the data flow, a maximum jitter value to the data flow, and/or some other QoS treatment to the data flow. In some implementations, network device 240 may schedule data flows such that the data flows receive QoS treatments in accordance with information stored by QoS field 430. Additionally, or alternatively, network device 240 may provide QoS treatments to data flows using some other technique.

In some implementations, information stored by data structure 400 may be based on a service level agreement (SLA) between a user of network device 240 and a network service provider associated with network device 240. For example, the SLA may include information that identifies network resources (e.g., bandwidth, services, etc.) that the user of network device 240 may use (e.g., to send and/or receive data flows to and/or from client devices 210). In some implementations, information stored in data structure 400 may be updated when the user selects to increase and/or decrease resource allocation (e.g., to satisfy an increase in resource demand or to reduce costs when resource demand is reduced). Additionally, or alternatively, information stored by data structure 400 may be updated when the user selects to modify QoS treatments of data flows. For example, different QoS treatments may correspond to different costs to be incurred by the user. In some implementations, a particular account number may be associated with multiple network devices 240 and/or associated with multiple different licenses, resource allocations, and/or QoS treatments. In some implementations, controller server 230 may generate activation instructions based on information stored by data structure 400 (e.g., to activate and/or deactivate network resources). For example, controller server 230 may generate an activation instruction to activate and/or deactivate network resources when the license is modified to reflect the network resources that are to be activated and/or deactivated.

In some implementations, information stored by data structure 400 may be used to audit network resources. For example, controller server 230 may compare network resource inventory (e.g., information that identifies total network resources) with licensing information (e.g., network usage) to determine available network resources. Further, controller server 230 may identify any discrepancies between an expected amount of available network resources with an actual amount of available network resources (e.g., to identify unauthorized network usage). In some implementations, information stored by data structure 400 may be used to plan network resource allocation by allowing an operator to identify network usage trends identified by license information stored by data structure 400 (e.g., such that activation of additional licenses, and in turn, activating of additional network resources may be planned).

In some implementations, a particular user may be associated with multiple licenses. For example, the particular user may purchase the multiple licenses and may activate the licenses in order to activate additional network resources. As described above, additional network resources may be activated based on modification of a single license.

While particular fields are shown in a particular format in data structure 400, in practice, data structure 400 may include additional fields, fewer fields, different fields, or differently arranged fields than are shown in FIG. 4.

Figure 5:
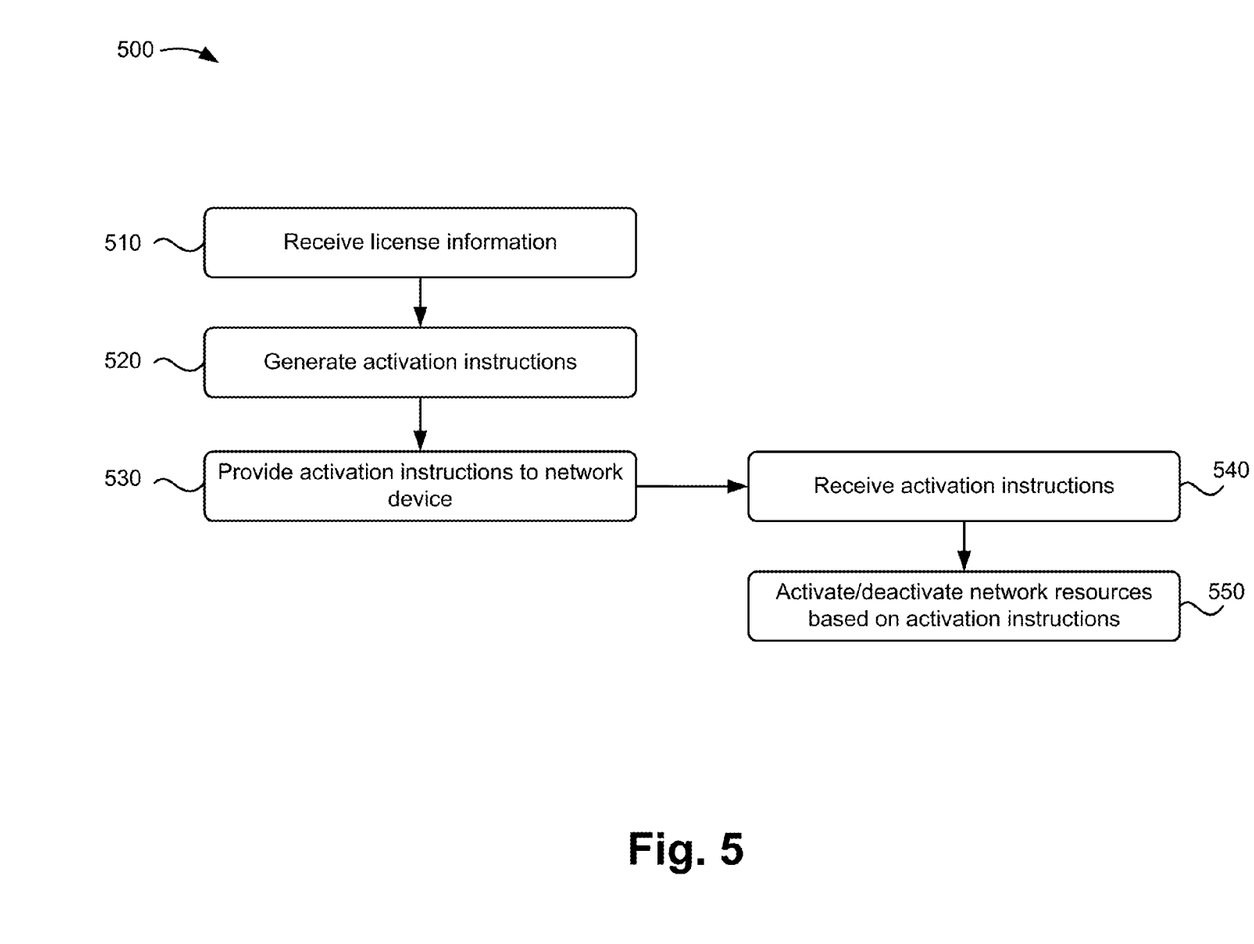
FIG. 5 illustrates a flowchart of an example process for activating and/or deactivating network channels in a network device.

FIG. 5 illustrates a flowchart of an example process for activating and/or deactivating network channels in a network device. In one implementation, process 500 may be performed by one or more components of controller server 230 and/or network device 240. In another implementation, some or all of blocks of process 500 may be performed by one or more components of another device in environment 200 (e.g., client device 210 and/or license server 220), or a group of devices including or excluding controller server 230 and/or network device 240.

As shown in FIG. 5, process 500 may include receiving license information (block 510). For example, controller server 230 may receive license information from license server 220. In some implementations, the license information may identify a measure of network resources to activate for a customer (e.g., a user of network device 240). For example, the license information may identify a particular license having the information that identifies the measure of network resources to activate for the customer. Additionally, or alternatively, the license information may identify multiple licenses that are to be activated/deactivated in order to activate/deactivate network resources associated with the multiple licenses. As described above, a customer may purchase multiple licenses and may activate the licenses as network resource demand increases. For example, a customer may purchase a particular quantity of licenses such that each license is associated with a particular amount of network resources (e.g., 100 gb of bandwidth per license). The customer may activate one license to activate 100 gb of bandwidth, and, at a later time, activate another license to activate an additional 100 gb of bandwidth (for a total of 200 gb of bandwidth). In some implementations, a particular license may be associated with a particular network card or particular network equipment, used to provide the network resources, when the license is activated. In some implementations, the network equipment may be activated when the license is activated and associated with the network equipment.

In some implementations, the license information may be received by controller server 230 when license server 220 receives license information from a user of network device 240 (e.g., via a user interface of license server 220, via a web portal accessible by user device 215, and/or via some other technique). For example, license server 220 may provide the license information to controller server 230 when license server 220 receives the license information from the user. In some implementations, the license information may include a new license for a new customer of network services, an update to an existing license associated with an existing customer of the network services, or an activation of a license in a group of multiple licenses. In some implementations, controller server 230 may identify network resources to activate and/or deactivate based on the license information. Additionally, or alternatively, license server 220 may provide controller server 230 with an instruction to activate and/or deactivate a particular network channel and/or network port.

In some implementations, controller server 230 may discover the license information and may retrieve the license information from license server 220 based on discovering that license information has been received by license server 220 (e.g., new license information for a new customer of the network services or an update to license information for an existing customer of the network services). For example, license server 220 may broadcast an indication that identifies that license information has been received. Additionally, or alternatively, controller server 230 may query license server 220 at regular intervals (e.g., 1 hour intervals, 2 hour intervals, 24 hour intervals, or some other interval) to discover when license information has been received by license server 220. As described above, the license information may correspond to information stored by data structure 400 and may correspond to a resource allocation for the user (e.g., based on a resource demand and/or a charge that the user agrees to pay for the resource allocation).

Process 500 may also include generating activation instructions (block 520). For example, controller server 230 may generate activation instructions based on receiving the license information. In some implementations, the activation instructions may cause network device 240 to activate and/or deactivate network resources such that the resource demand of the user is satisfied. In some implementations, the activation instruction may assign a particular network card or network equipment, used to provide the network resources, to a particular license (e.g., based on the license information). That is, the activation instruction may correspond to an assignment of network resources to a license and an assignment of network equipment to a license.

In some implementations, the activation instructions may cause network device 240 to invoke software implemented by network device 240 to modify instructions of one or more components of network device 240 in order to activate and/or deactivate network channels. In some implementations, the activation instructions may include an executable computer file, a configuration file, and/or some other type of file that network device 240 may interpret and use to activate and/or deactivate network channels. In some implementations, the activation instructions may include a header having a hash value, a signature, or some other form of identifier to identify that controller server 230 generated the activation instructions (e.g., to prevent network device 240 from applying activation instructions provided by an unauthorized device).

In some implementations, controller server 230 may generate activation instructions using automated techniques (e.g., without receiving license information) to automatically adjust resource allocation for a user. For example, controller server 230 may generate activation instructions based on a measure of load associated with active network channels of network device 240. As an example, assume that network device 240 includes a total of five network channels, each providing 100 gbps of bandwidth. Further, assume that three of the five network channels are activated, thereby providing 300 gbps of bandwidth. Further, assume that the average bandwidth usage of the three network channels over a particular period of time (e.g., a one month period of time or some other period of time) is 270 gbps (e.g., the network channels are 90% loaded). Given these assumptions, controller server 230 may generate activation instructions to cause network device 240 to activate the two inactive network channels to reduce the percentage of load on the active network channels.

In some implementations, controller server 230 may generate activation instructions to activate network channels based on some other percentage of load. For example, controller server 230 may generate activation instructions to activate network channels when the active network channels are 50% loaded, 60% loaded, 70% loaded, or some other percentage loaded. Additionally, or alternatively, controller server 230 may generate activation instructions to deactivate network channels when the percentage of load drops below a particular threshold (e.g., when the percentage of load drops below 50%, 40%, 30%, or below some other threshold percentage of load). In some implementations, the percentage of load of active network channels may be provided to controller server 230 from network device 240. For example, network device 240 may include a data logging function to track the percentage of load over a particular period of time. Activate/deactivate a license in a pool.

In some implementations, controller server 230 may generate the activation instructions based on information associated with the license. For example, the license may include an authorization for controller server 230 to generate activation instructions to activate a network channel when the percentage of load exceeds a particular threshold. Additionally, or alternatively, the license may include an authorization for an increase in fees relating to an increase in the quantity of network channels that may be activated. Additionally, or alternatively, the license may include information to direct controller server 230 to generate a activation instruction to deactivate network channels when the percentage of load drops below a particular threshold.

In some implementations (e.g., when controller server 230 generates the activation instructions using automated methods to automatically adjust resource allocation for a user), controller server 230 may provide information that identifies newly activated/deactivated channels and/or network ports such that license server 220 may update the license to reflect the newly activated/deactivated channels and/or network ports. In some implementations, license server 220 may provide updates to the license information (e.g., when updated license information is received from a customer of the network services and/or when the updated license information is received from controller server 230) to billing server 250 such that billing server 250 may assess debits and/or credits to appropriate accounts (e.g., an account associated with the network service provider and/or an account associated with the customer). In some implementations, the automatic adjustment of resource allocation may correspond to an automatic adjustment in fees charged to the user. For example, when resource allocation is increased, fees charged to the user may increase accordingly. When resource allocation is decreased, fees charged to the user may decrease accordingly.

Process 500 may further include providing the activation instructions to the network device (block 530). For example, controller server 230 may provide the activation instructions to network device 240. In some implementations, controller server 230 may identify a particular network device 240 which to provide the activation instructions (e.g., based on the license information that identifies the particular network device 240 with which the user is associated). In some implementations, controller server 230 may identify an internet protocol (IP) address of the particular network device 240 and may establish a tunnel with the particular network device 240 based on the IP address. In some implementations, the tunnel may prevent the activation instructions from being intercepted and/or compromised by an unauthorized device (e.g., to prevent an unauthorized party to modify the activation instructions that may lead to network channels being activated/deactivated without authorization). For example, the activation instructions may be transmitted by the tunnel using a secure transport protocol (e.g., the hyper terminal transport secure (HTTPS) protocol and/or some other secure transport protocol) such that activation instructions may not be intercepted and/or compromised. Additionally, or alternatively, the activation instructions may be encrypted in a manner to allow network device 240 to decrypt the activation instructions without allowing an unauthorized device to decrypt the activation instructions.

Process 500 may also include receiving the activation instructions (block 540). For example, network device 240 may receive the activation instructions from controller server 230 via the tunnel. In some implementations, network device 240 may identify the activation instructions based on a header of the activation instructions. Additionally, or alternatively, network device 240 may authenticate the activation instructions by performing a signature verification function to determine that the activation instructions came from controller server 230 and not from an unauthorized device.

Process 500 may further include activating/deactivating network resources based on the activation instructions (block 550). For example, network device 240 may activate and/or deactivate network channels based on receiving the activation instructions and based on authenticating the activation instructions. In some implementations (e.g., to deactivate a network channel), network device 240 may modify routing component 305 and/or routing component 307 to prevent packets of a data flow, provided by a client device 210 associated with the user, from being provided to the network channel and/or line card 310 associated with the network channel. For example, network device 240 may mark packets of a data flow, associated with the network channel (e.g., by storing an indication in respective headers of the packets), to indicate packets that are not to be routed to the network channel. In some implementations, switch fabric 302, switch 306, routing component 305, and/or routing component 307 may discard the marked packets to prevent the marked packets from being provided to the network channel.

Additionally, or alternatively, network device 240 may modify a routing table to route packets away from the network channel and to a dropping component. Additionally, or alternatively, network device 240 may deactivate a particular switch 306 that provides packets to the network channel. Additionally, or alternatively, network device 240 may prevent routing component 307 from converting a data flow to a format compatible with the network channel or with a PIC 310 that provides the network channel. For example, network device 240 may prevent routing component 307 from converting an electrical signal to an optical signal (or prevent routing component 307 from converting from an optical signal to an electrical signal), such that PIC 310 is unable to process the data flow.

Additionally, or alternatively, network device 240 may deactivate a service (e.g., a packet delivery service), provided by switch 306 and/or some other component of network device 240, such that the packets of the data flow are not provided to the network channel. Additionally, or alternatively, network device 240 may provide data packets, provided by data generator component 308, to line card 310 via the network channel such that line card 310 receives data packets provided by data generator component 308 (e.g., to occupy the network channel) and does not receive data packets provided by the user (e.g., provided by client device 210).

In some implementations (e.g., to deactivate a network port), network device 240 may power off the network port. Additionally, or alternatively, network device may deactivate a network port by causing routing component 305 to route a data flow, received by inactive network port (e.g., a network port that is to be deactivated), to a packet dropper. Additionally, or alternatively, network device 240 may discard packets received via an inactive network port. Additionally, or alternatively, network device 240 may prevent routing component 305 from processing data flows received via an inactive network port. In some implementations, (e.g., to activate a network port), network device 240 may power on the network port and/or provide a data flow, received by the network port, towards a destination.

In some implementations (e.g., to activate a network channel), network device 240 may modify routing component 305 and/or routing component 307 to allow packets of a data flow, provided by a client device 210 associated with the user, to be provided to the network channel and/or line card 310 associated with the network channel. Additionally, or alternatively, network device 240 may activate a service (e.g., a packet delivery service), provided by switches 306 and/or some other component of network device 240, such that the packets of the data flow are provided to the network channel. Additionally, or alternatively, network device 240 may prevent data packets, provided by data generator component 308, from being provided to line card 310 via the network channel such that the network channel is available to receive data packets provided by client device 210. Additionally, or alternatively, network device 240 may deactivate data generator component 308 altogether such that the network channel is available to receive data packets provided by client device 210. Additionally, or alternatively, network device 240 may activate the network channel using some other technique.

While a particular series of blocks has been described above with regard to FIG. 5, the operations, data flows, and/or the order of the blocks may be modified in other implementations. Further, non-dependent operations and/or data flows may be performed in parallel. In some implementations, some blocks described as being performed by network device 240 may be performed by controller server 230. Additionally, or alternatively, some blocks being performed by controller server 230 may be performed by network device 240. For example, network device 240 may receive license information, generate activation instructions based on the license information and/or based on automated techniques, and may execute the activation instructions based on generating the activation instructions to activate and/or deactivate a network channel.

Figure 6:
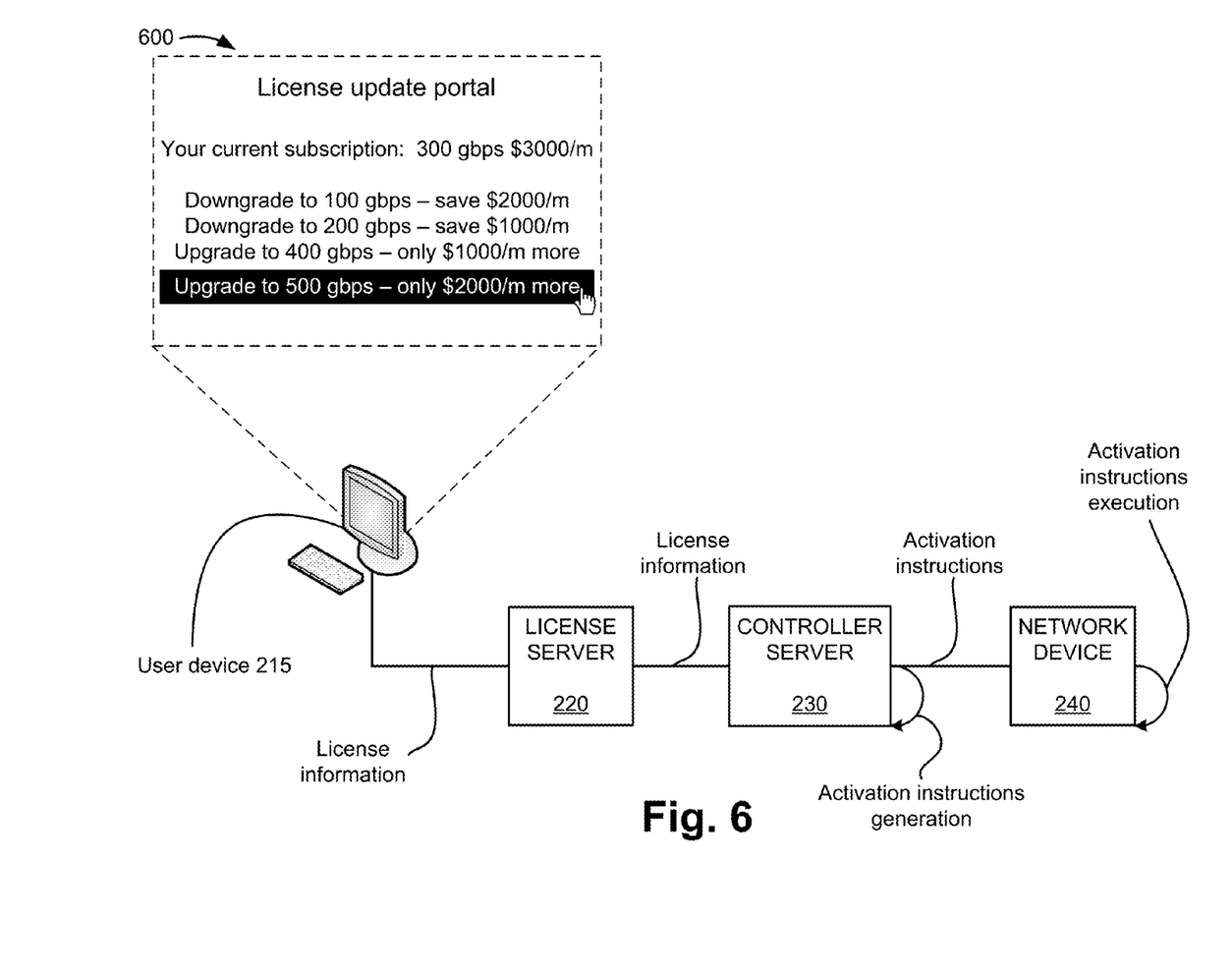
FIG. 6 illustrates an example implementation as described herein.

FIG. 6 illustrates an example implementation as described herein. As shown in FIG. 6, a user (e.g., a customer of network services) may access license server 220 using user device 215 via a web portal represented in interface 600. In some implementations, and as shown in interface 600, the user may select to increase or decrease resources (e.g., bandwidth) associated with the user's subscription. As further shown in interface 600, pricing information for different bandwidth amounts may be given such that the user may select a bandwidth within a particular price range. In some implementations, license server 220 may provide, to controller server 230, license information having the updated bandwidth amount selected by the user. As described above, the license information may additionally, or alternatively, include information identifying a particular license of multiple licenses to activate in order to activate network resources. In some implementations, controller server 230 may generate activation instructions based on receiving the license information and may provide the activation instructions to network device 240 (e.g., in accordance with process 500). In some implementations, network device 240 may receive the activation instructions and may execute the activation instructions to activate network channels in order to provide the selected amount of bandwidth.

In some implementations, interface 600 may include some other information not shown in FIG. 6. For example, interface 600 may include diagnostic related information that identifies whether network channels are performing properly with respect to a performance metric. For example, as described above, data generator component 308 may provide an optical signal to line card 310 (e.g., via routing component 307 and/or via a network channel of line card 310). In some implementations, routing component 307 may receive a response, associated with the optical signal, and may determine that the network channel of line card 310 is able to send and receive data properly (e.g., when the response includes data corresponding to data sent by data generator component 308). In some implementations, interface 600 may appear different and may have a different format that what is shown in FIG. 6.

As described above, network resources may be activated and/or deactivated (e.g., based on receiving an instruction from the user to activate and/or deactivate the network resources and/or based on an automated technique that activates and/or deactivates network resources, without user interaction). In some implementations, network resources may be activated and/or deactivated without a modification in a hardware configuration of network device 240. That is, network channels may be activated and/or deactivated without installing new hardware, removing old hardware, or reconfiguring existing hardware, thereby reducing time and cost associated with increasing or decreasing a user's network resource allocation.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a network device, data flows from a client, an activation instruction, and a deactivation instruction,
      the network device providing network resources, a first network resource of the network resources being a first optical channel having a first wavelength and a second network resource of the network resources being a second optical channel having a second wavelength,
      the activation instruction being associated with a license that identifies a resource request of a user;
   configuring, by the network device and based on the activation and deactivation instructions, a component of the network device to output a wavelength multiplexed (WDM) signal including the first and second optical channels, the first optical channel carrying information indicative of the data flow from the client supplied to the network device, the first optical channel being activated, and the second optical channel carries a bit sequence indicative of an output of a data generator provided in the network device, the second optical channel being deactivated such that the second optical channel does not carry any portion of the data flows supplied to the network device,
   wherein the bit sequence includes a random or pseudo-random series of bits.

2. The method in accordance with claim 1, where the component is a switch or routing processor.

3. The method in accordance with claim 1, where the license is used to audit the network resources or plan network resource allocation.

4. The method in accordance with claim 1, further comprising:
establishing a tunnel with a server device,
where receiving the activation instruction includes receiving the activation instruction from the server device via the tunnel,
the tunnel permitting the activation instruction to be securely transmitted to the network device.

5. The method in accordance with claim 1, further comprising:
determining a measure of load associated with the network resources; and
generating the activation instruction based on the measure of load associated with the network resources,
where receiving the activation instruction is based on generating the activation instruction.

6. A system comprising:
a network device configured to:
receive a data flow from a client, an activation instruction, and a deactivation instruction,
the network device providing network resources, a first network resource of the network resources being a first optical channel having a first wavelength and a second network resource of the network resources being a second optical channel having a second wavelength,
the activation instruction being associated with a license that identifies a resource request of a user;
instruction, a component of the network device including a component and a data generator, such that, based on the activation and deactivation instructions, the component outputs a wavelength multiplexed (WDM) signal including the first and second optical channels, the first optical channel carrying information indicative of the data flow from the client supplied to the network device, the first optical channel being activated, and the second optical channel carries a bit sequence indicative of an output of a data generator provided in the network device, the second optical channel being deactivated such that the second optical channel does not carry any portion of the data flows supplied to the network device,
wherein the bit sequence includes a random or pseudorandom series of bits.

7. The system in accordance with claim 6, where the component includes a switch or routing processor.

8. The system in accordance with claim 6, where the license is used to audit the network resources or plan network resource allocation.

9. A non-transitory computer-readable medium for storing instructions, the instructions comprising:
a plurality of instructions which, when executed by one or more processors associated with a network device, cause the one or more processors to:
receive a data flow from a client, an activation instruction, and a deactivation instruction,
the network device providing network resources, a first network resource of the network resources being a first optical channel and a second network resource of the network resources being a second optical channel,
the activation instruction requesting the network device to activate a particular network resource that is deactivated,
the activation instruction being associated with a license that identifies a resource request of a user;
configure, based on the activation instruction and the deactivation instruction, a component of the network device to output a wavelength multiplexed (WDM) signal including the first and second optical channels, the first optical channel carrying information indicative of the data flow from the client supplied to the network device, the first optical channel being activated, and the second optical channel carries a bit sequence indicative of an output of a data generator provided in the network device, the second optical channel being deactivated such that the second optical channel does not carry any portion of the data flows supplied to the network device,
wherein the bit sequence includes a random or pseudorandom series of bits.

10. The computer-readable medium in accordance with claim 9 where the license is used to audit the network resources or plan network resource allocation.

* * * * *